F. BANGERTER.
AUTOMATIC RAPID FIRE MACHINE GUN.
APPLICATION FILED NOV. 4, 1918.
1,424,751.
Patented Aug. 8, 1922.
9 SHEETS—SHEET 3.
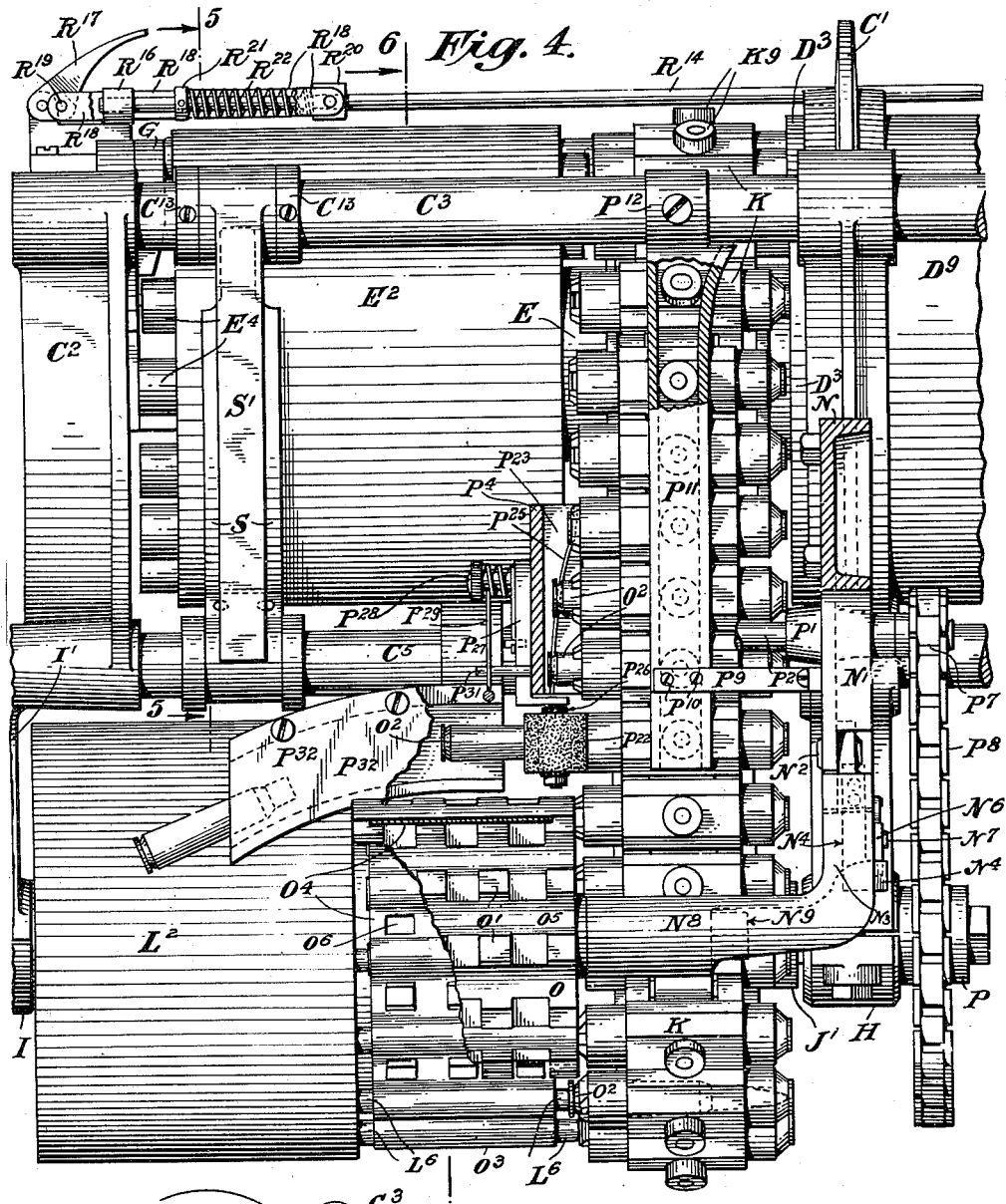
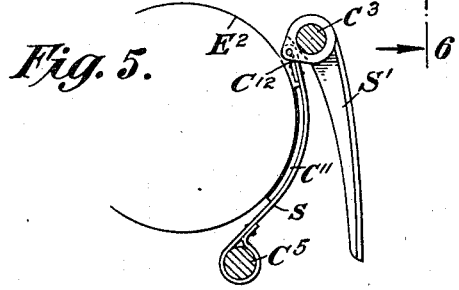
Inventor
Friedrich Bangerter
By his Attorneys
Macdonald & Macdonald

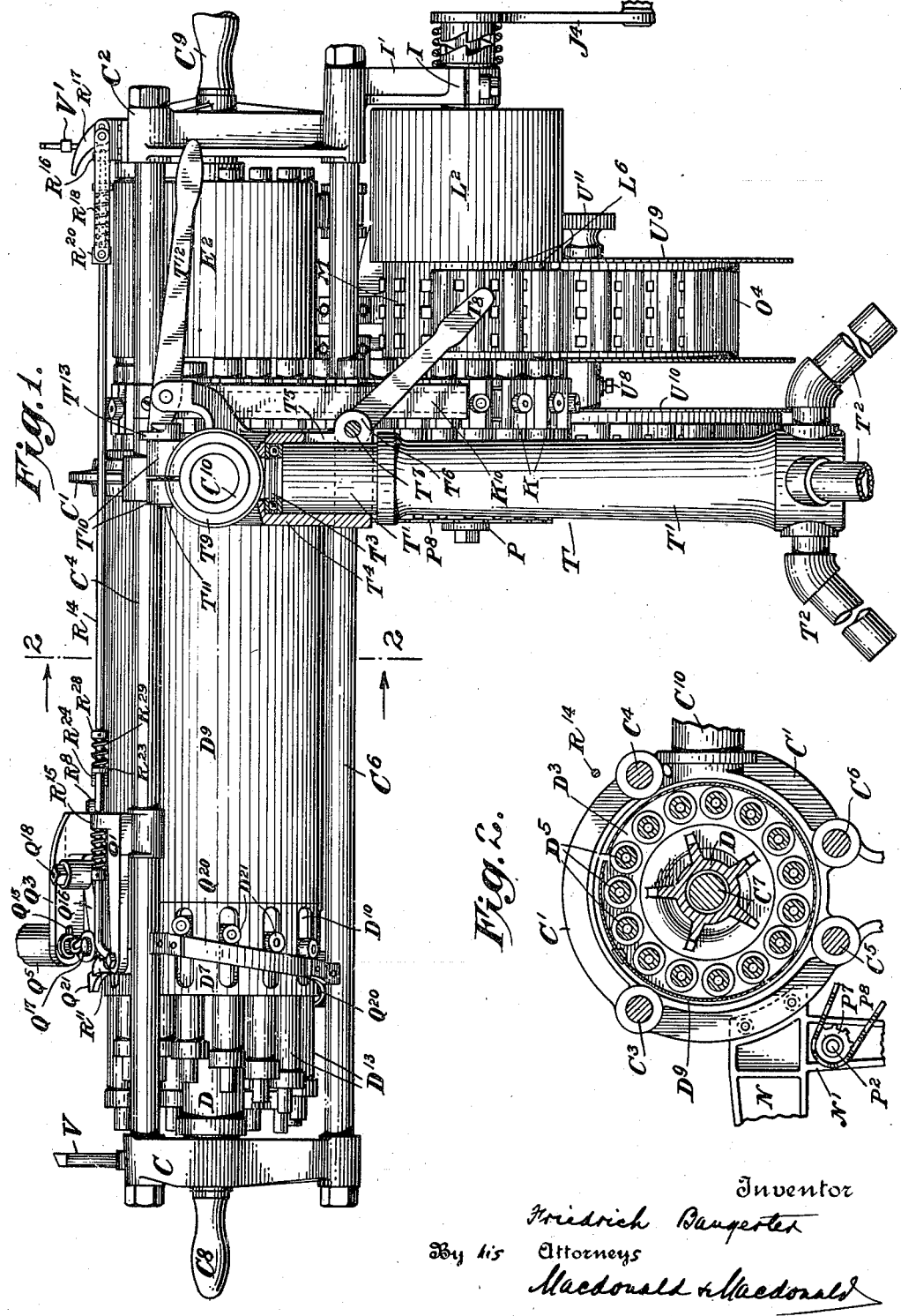

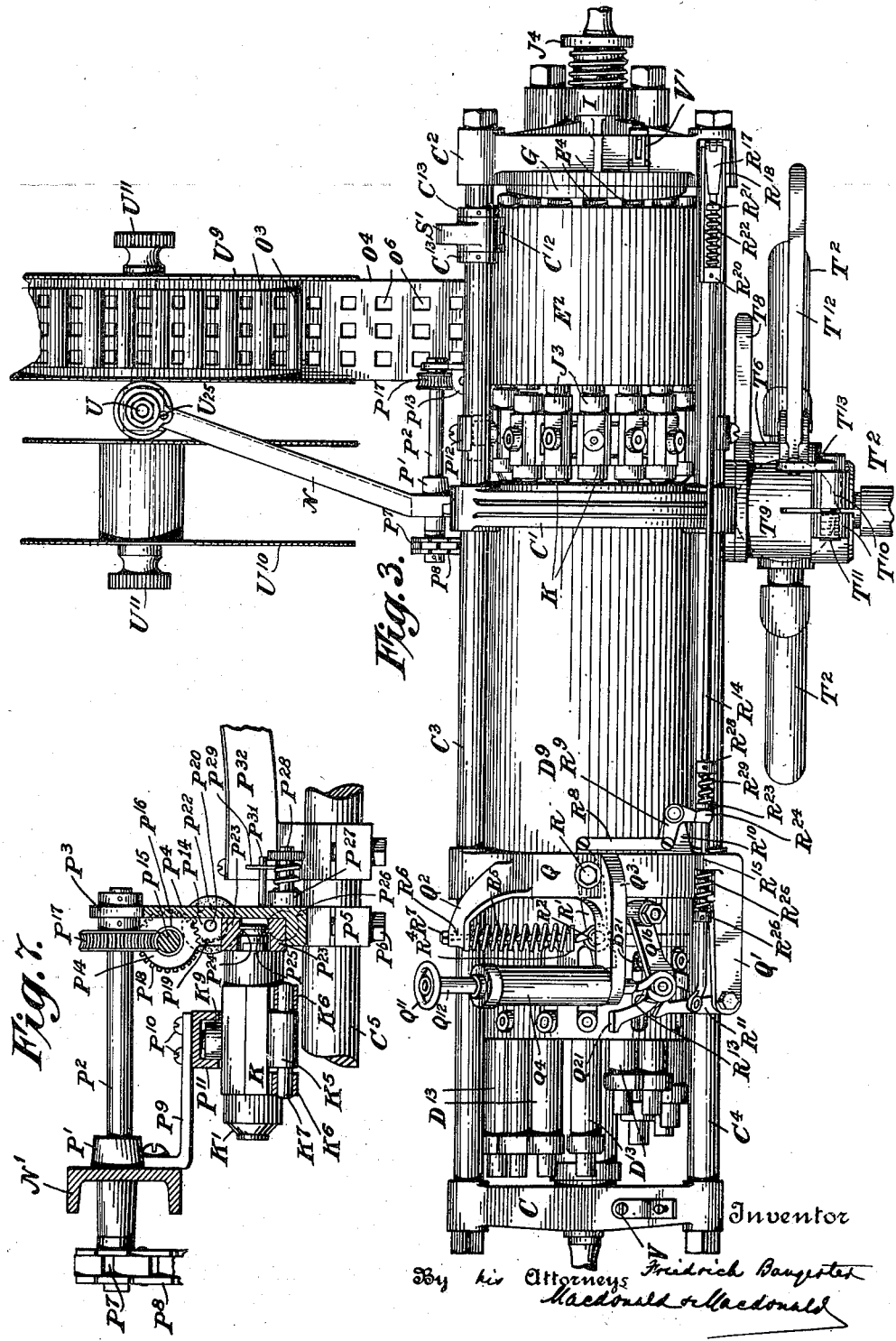

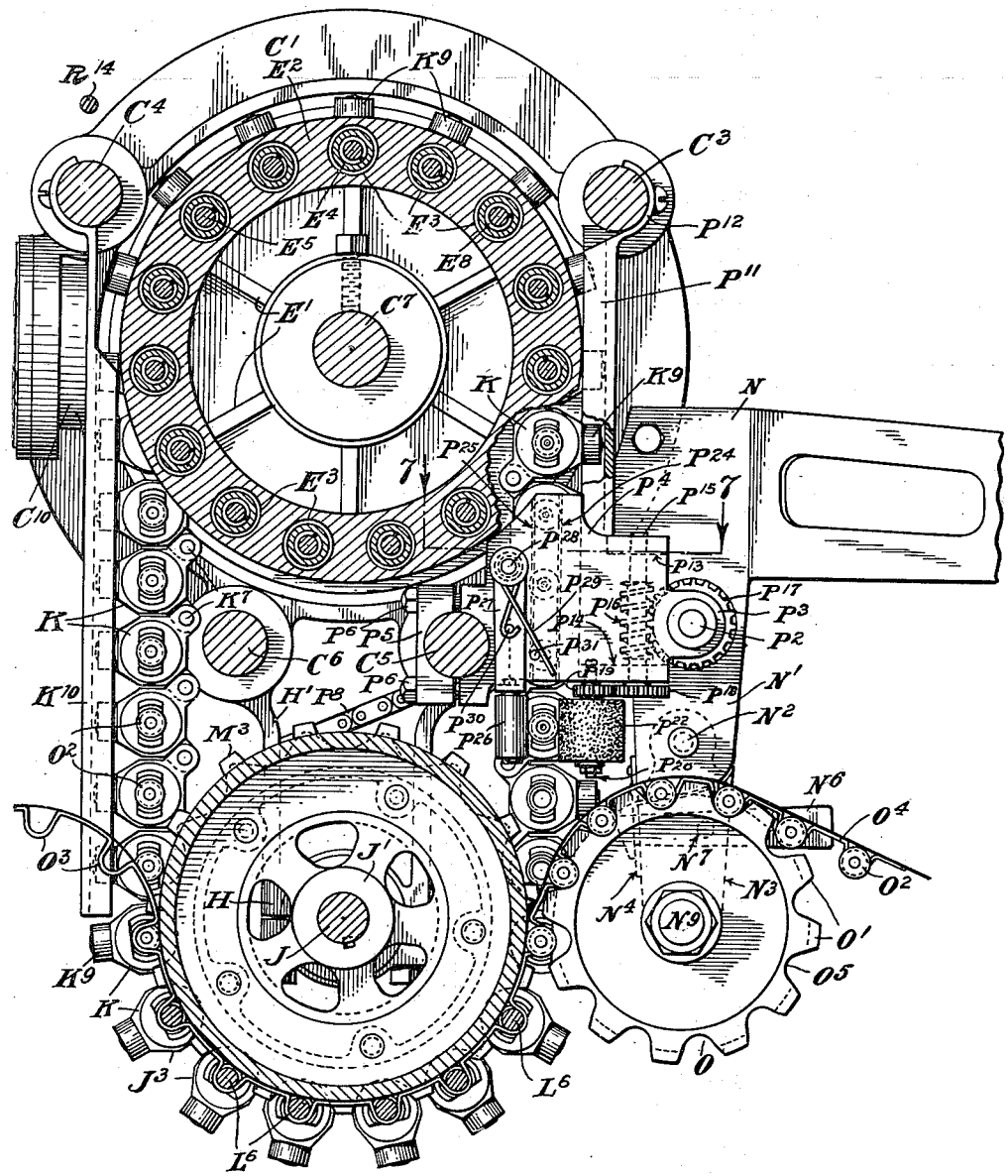

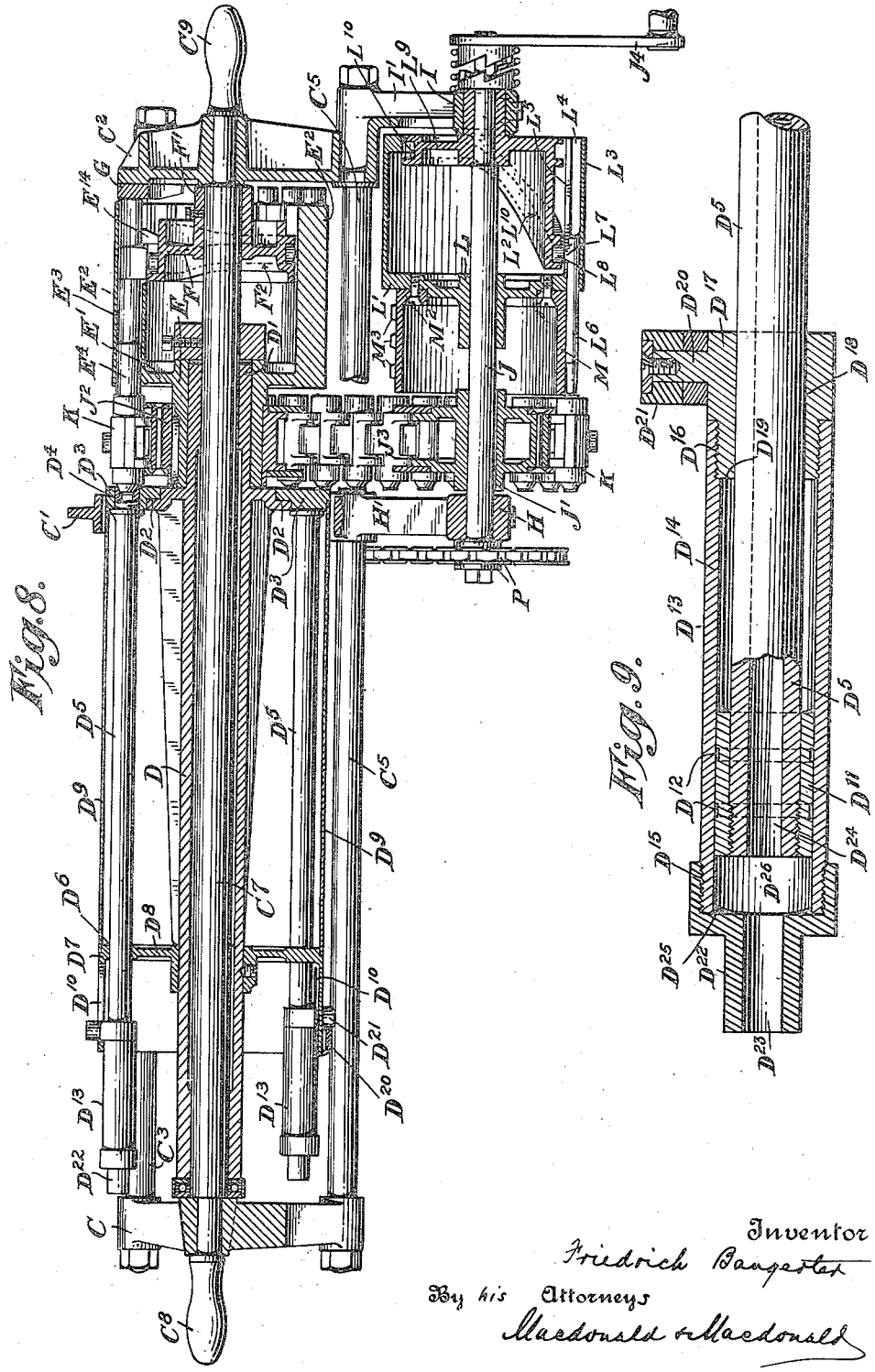

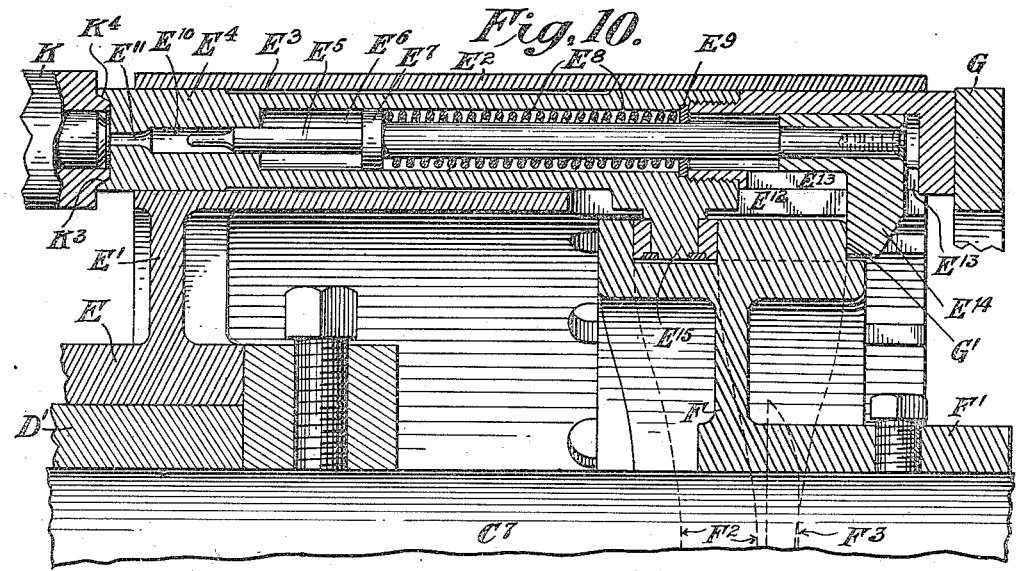
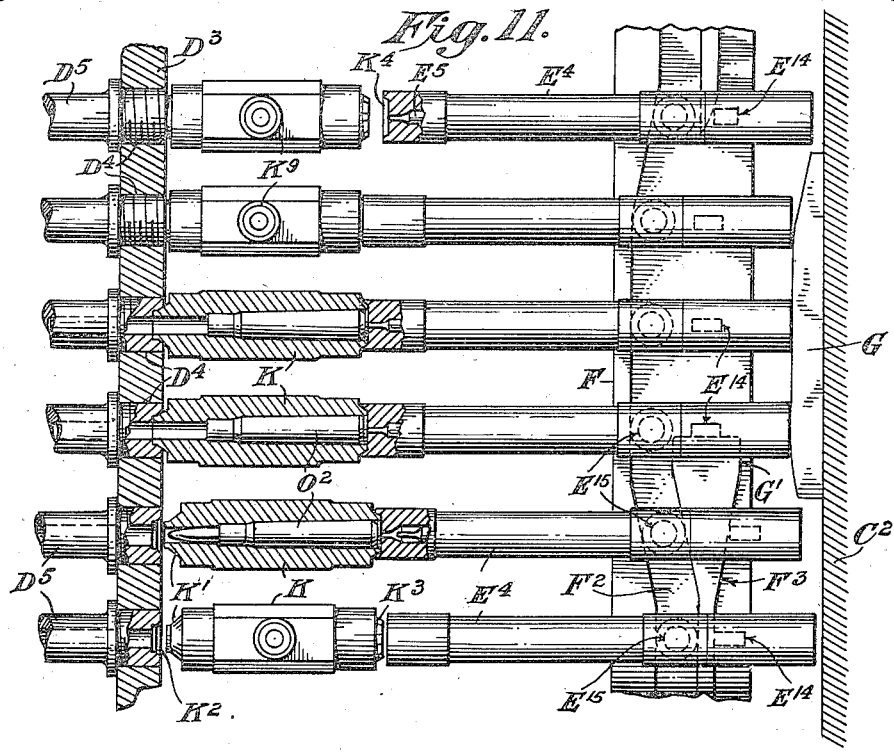

F. BANGERTER.
AUTOMATIC RAPID FIRE MACHINE GUN.
APPLICATION FILED NOV. 4, 1918.

1,424,751.

Patented Aug. 8, 1922.
9 SHEETS—SHEET 7.

Inventor
Friedrich Bangerter
By his Attorneys
Macdonald & Macdonald

UNITED STATES PATENT OFFICE.

FRIEDRICH BANGERTER, OF NEW YORK, N. Y.

AUTOMATIC RAPID-FIRE MACHINE GUN.

1,424,751. Specification of Letters Patent. Patented Aug. 8, 1922.

Application filed November 4, 1918. Serial No. 261,023.

*To all whom it may concern:*

Be it known that I, FRIEDRICH BANGERTER, a citizen of the United States, residing in the city of New York, borough of Manhattan, in the county and State of New York, have invented certain new and useful Improvements in Automatic Rapid-Fire Machine Guns, of which the following is a full, clear, and exact specification, such as will enable others skilled in the art to which it appertains to make and use the same.

This invention relates to machine guns of the automatic type, wherein the energy generated by the explosion of the charge is utilized, through various connected mechanisms, to load and cock the weapon, fire the charge, eject the empty shells, and feed the ammunition to the gun.

The object of my invention is to provide a machine gun which may be continuously fired by hand or which may be continuously fired automatically, after the initial explosion, one which is light, stable and durable in continuous operation, safe, accurate and reliable in firing, comparatively simple in construction, and which is capable of extremely rapid fire, varying from one shot to several thousand shots per minute.

A further object of my invention is to provide an automatic machine gun which can be readily and quickly taken apart and set up in position for operation, with convenient means for training, elevating and depressing, and wherein the liability to heating of the parts is reduced to a minimum, if not completely eliminated. My gun is particularly designed for the use of rifle cartridges of standard make, but, due to the novel features of construction, it will be evident that there is no limit to the size of the shells that may be used in connection therewith, and, while the drawings show a gun with fifteen barrels and thirty one explosion chambers in the travelling magazine, it will also be apparent that these numbers may be increased to almost any desired extent by similarly proportioning the other parts of the mechanism.

All of the foregoing objects, as well as others ancillary thereto, will be made clear by the following description, taken in connection with the accompanying drawings, in which,—

Fig. 1 is a side elevation of the gun, as viewed from what is the left hand side when looking from the breech towards the muzzle;

Fig. 2 is a transverse section thereof, on line 2—2 of Fig. 1, with certain parts omitted;

Fig. 3 is a plan view of the gun and ammunition reels for use therewith;

Fig. 4 is a side elevation, partly in section, of the loading, firing and ejecting mechanism, as viewed from the side opposite that shown in Fig. 1;

Fig. 5 is a transverse section, on a reduced scale, on line 5—5 of Fig. 4, showing a braking means;

Fig. 6 is a transverse section on line 6—6 of Fig. 4, in the direction of the arrows;

Fig. 7 is a fragmentary horizontal section through the ejecting mechanism, indicated generally on line 7—7 of Fig. 6, in the direction of the arrows;

Fig. 8 is a central, vertical, longitudinal section, with certain parts omitted;

Fig. 9 is a detail sectional view, partly in elevation, of the forward end of one of the barrels and the longitudinally movable motor cylinder thereon;

Fig. 10 is a longitudinal fragmentary section of the firing cylinder and of one of the clamping bolts, with the firing pin therein, showing the relation of said members to the cams for guiding the same, and in position just previous to firing;

Fig. 11 is a diagrammatic view illustrating a development of an arc through which the barrels, magazine and clamping bolts, with their contained firing pins, travel, and the relative positions of said clamping and firing members with respect to their guiding cams;

Figure 12:
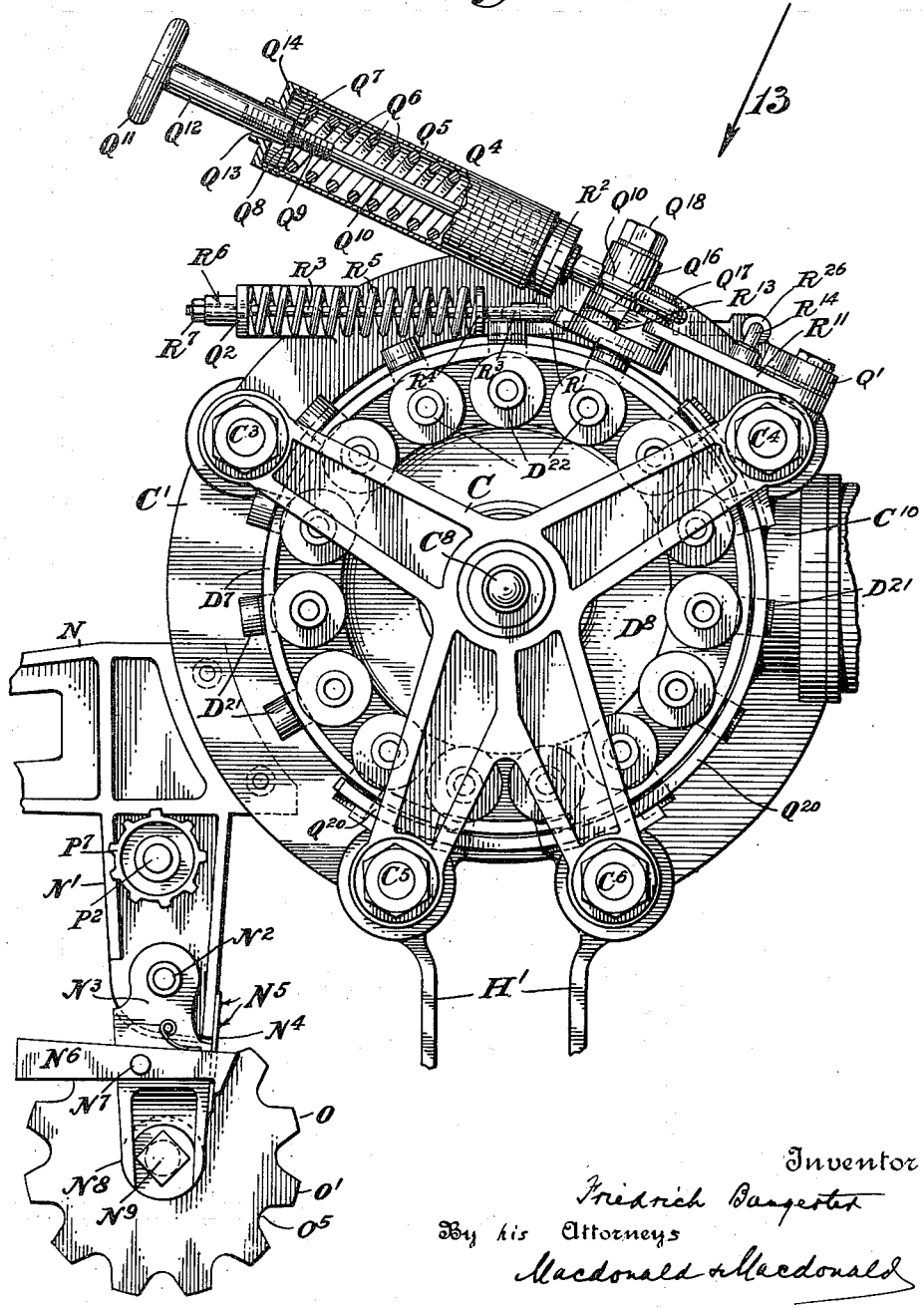
Fig. 12 is an end elevation of the forward end of the gun, with certain parts omitted.

Referring to the construction illustrated: The main frame work of the gun comprises a plurality of relatively light but strong transverse supporting members $C$, $C'$, $C^2$, which are rigidly held in position by longitudinal tie rods $C^3$, $C^4$, $C^5$, $C^6$, and also by a longitudinal, stationary bearing rod $C^7$, all of said rods being immovably secured at their ends to the transverse supporting members $C$, $C^2$, and affording a rigid supporting structure, the bearing rod $C^7$ being provided with handles $C^8$, $C^9$. The transverse frame member $C'$ is located at approximately the longitudinal center of gravity of the frame and carried parts, and at one side (see Figs. 1, 2, 3, 12), has formed, integrally therewith, a trunnion $C^{10}$, by which the framing structure just described, and the mechanism carried thereby, are held in position upon a suitable stand embodying means providing for all necessary movements for training the gun upon a target in any angle or position. The stand will be described after a description has been had of the gun mechanism.

Mounted to rotate freely upon the bearing rod $C^7$ is an elongated hollow tube or sleeve D, having a rearward extension thereof $D'$, to which latter certain working parts are connected, as will be hereinafter set forth.

Near the rear end of the sleeve D, in an angular recess therein $D^2$, is rigidly held, a ring $D^3$, which is provided annularly with a plurality of bores $D^4$. The bores $D^4$ are threaded, and receive therein the threaded ends of a plurality of rifled barrels $D^5$. The forward ends of the barrels $D^5$ are supported within an annular series of bores $D^6$ in a casing $D^7$, the bored head $D^8$ of which is mounted upon and is rigidly secured to, the sleeve D. The bores $D^6$ are not necessarily threaded, but should afford a watertight fit, for, mounted upon the ring $D^3$ and upon said head $D^8$ is a sheet metal cylinder $D^9$, to the interior of which a liquid may be admitted and circulate therein, to act as a cooling agent for the barrels.

The casing $D^7$ is provided with a series of elongated guide openings $D^{10}$, the walls of which openings act as guides and bearings for certain gas-operated motor parts carried by the barrels $D^5$. These parts are more clearly shown in Fig. 9.

Securely held to the exteriorly threaded end of each of the barrels $D^5$ is an interiorly threaded collar $D^{11}$, which may have packing rings, as at $D^{12}$, upon which collar the cylinder, indicated at $D^{13}$ is adapted to slide. The member $D^{13}$ comprises a cylindrical casing $D^{14}$, exteriorly threaded at one end, as at $D^{15}$, and interiorly threaded at the other end, as at $D^{16}$. Within the latter threaded end is an exteriorly threaded plug $D^{17}$, having a bore $D^{18}$, whereby it is adapted to bear slidingly upon the barrel $D^5$, and the forward face of which, $D^{19}$, contacts with the rear end of the collar $D^{11}$ when the cylinder $D^{13}$ is moved forwardly. The upper side of the plug $D^{17}$ is formed with an extension $D^{20}$, carrying a roller $D^{21}$, which acts as a contact member for the parts presently to be described. Engaging the forward threaded end of the cylinder $D^{13}$ is an interiorly threaded cap $D^{22}$, which has a bore $D^{23}$, of the same size as, and truly aligned with, the bore $D^{24}$ of the barrel $D^5$. The rear portion of the cap $D^{22}$, it will be observed, is enlarged, the rear wall of which, $D^{25}$, in conjunction with the wall of the cylinder $D^{14}$, the end of the collar $D^{11}$ and the end of the barrel $D^5$, forms an expansion chamber $D^{26}$, wherein the expansion of the gas resulting from the combustion of the explosive in the explosion chamber, has the effect, of propelling forward the cylinder $D^{13}$ and carrying therewith the roller-bearing contact member $D^{21}$, the full operation of which will be hereinafter described. It will suffice, for the present, to state that in the forward movement of the cylinders $D^{13}$, under action of the gas pressure, the contact members $D^{21}$ travel in, and are guided by, the longitudinal guide openings $D^{10}$ in the guide casing $D^7$, and, on this movement, in connection with other parts to be described, effect the rotation of the barrel cylinder and provide the motive power for the automatic operation of the gun mechanism.

I will now describe the firing mechanism. Mounted upon the extension $D'$ of the elongated sleeve D, is a hub E, and, formed integrally therewith, is what I will term the firing cylinder, indicated at $E'$, the outer rim of which, $E^2$, is of sufficient thickness to have therein an annular concentric row of bores $E^3$, each of which bores contains a hollow clamping bolt $E^4$, within which is enclosed a firing pin $E^5$. Each clamping bolt $E^4$ has a central horizontal bore $E^6$, the walls of which act as a guide for a movable head $E^7$, fast to the firing pin $E^5$, one end of a spring $E^8$ acting against the movable head $E^7$, and the other end of the spring contacting with the stationary head $E^9$. The bore $E^6$ is of reduced diameter at $E^{10}$, $E^{11}$, to accurately guide the firing pin where the latter likewise is of reduced diameter.

The walls of the bores $E^3$ nearest the center of the firing cylinder $E'$, have a series of slots $E^{12}$, and the clamping bolts $E^4$ are slotted at $E^{13}$, both of these slots being contiguous to a combination race cam located on a stationary cam member, into the races of which protuberances on the clamping bolt and on the firing pin project, and by which said bolts and firing pins are controlled.

The rear end of the firing pin $E^5$ is provided with an inwardly projecting trigger $E^{14}$, whose function it is to guide and retract the firing pin into and out of firing position, and when in that position, to release the firing pin and explode the charge; and the clamping bolt $E^4$ has an inwardly projecting roller bearing guide member $E^{15}$, by which the operative movements of the clamping bolt are controlled.

The combination race cam member, to which reference has just been made, is indicated at F, comprising a bearing $F'$, fast to the rod $C^7$, and containing a cam groove $F^2$, which is traversed by the guiding member $E^{15}$ of the clamping bolt $E^4$, and an angular cam groove or surface $F^3$, in and against which the trigger $E^{14}$ travels and contacts.

Since the firing cylinder $E'$ is fast to the extension $D'$ of the barrel sleeve D, it rotates with the barrel cylinder, and it will be understood that each of the clamping bolts $E^4$ is in horizontal alignment with the barrels $D^5$ of the barrel cylinder.

The cam race $F^2$ moves the clamping bolt slightly to the left, in the annular travel of the latter, serving to bring said bolt into proper position to be finally acted upon endwise by a plate cam G, secured to the inner face of the end frame member $C^2$. At the same time, the trigger $E^{14}$ is acted upon by the cam surface $F^3$ to move it in a direction contrary to that taken by the clamping bolt and against the action of the spring $E^8$, until, when it reaches the farthest point of retraction, as indicated at $G'$ it is released, and therewith also, under action of the spring $E^8$, the firing pin $E^5$ is released to explode the charge contained in the explosion chamber of a travelling magazine which lies between the barrel cylinder and the firing cylinder, said clamping bolt, under pressure of the cam plate G, serving to bind the rifled barrel and the explosion chamber rigidly together endwise in true horizontal alignment.

Referring now to the travelling magazine, which may be driven either automatically or by hand, and, in either case, is loaded and the empty shells ejected automatically, as will be shown hereinafter.

Mounted within bearings H, I,—the former upon an extension $H'$ of the cross frame $C'$, and the latter upon the extension $I'$ of the end frame $C^2$,—is a shaft J, which acts both as a drive shaft and a driven shaft, depending upon the source from which the power is derived.

Mounted upon the shaft J, and fast thereto, is a sprocket wheel $J'$. Directly above the sprocket wheel $J'$, and carried by the hub E, and fast thereto, and thereby adapted to rotate with the sleeve D of the barrel cylinder, is a sprocket wheel $J^2$.

Carried by the sprocket wheels $J'$, $J^2$, is an endless travelling magazine, indicated in whole at $J^3$. Besides acting as such travelling magazine, it also acts as a sprocket or chain drive.

It will be noted that by means of the hand operated crank $J^4$ and shaft J, the member $J^3$ may drive the sprocket wheel $J^2$. and thereby rotate the barrel cylinder $D^9$, or, when the barrel cylinder $D^9$ is automatically rotated, as hereinafter explained, the shaft J and connected mechanism will be thereby actuated.

The travelling magazine is made up of a number of units K, connected together, in the form, and performing the function, of a chain drive. Each of the units K is an explosion chamber, each carrying to the firing point a cartridge for explosion in said chamber.

Stripped of the structural features which adapt the connected magazine units to serve as a chain drive, the form of the explosion chambers K is well illustrated in Fig. 11.

The longitudinal center line of each explosion chamber K is carried into true horizontal alignment with the longitudinal center line of the barrels $D^5$ and the center line of the firing pins $E^5$ of the clamping bolts $E^4$ respectively.

As illustrated in said Fig. 11, the forward end of each explosion chamber is formed with an annular concentric projection indicated at $K'$, said projection comprising a plurality of angular and cone shaped surfaces corresponding with and fitting into a similarly shaped depression $K^2$ in the end of the barrels $D^5$. A projection $K^3$, at the other end of the explosion chambers, is adapted to be received within a depression $K^4$, correspondingly shaped to receive and fit the same, in the ends of the clamping bolts $E^4$, so that when the clamping bolts are rigidly tightened, the respective projections $K'$, $K^3$ will be held immovably in the respective depressions $K^2$, $K^4$. As shown in said Fig. 11, this rigidly locked position is reached when the rear end of a clamping bolt $E^4$ has been moved, by the contact member $E^{15}$ travelling in the cam race $F^2$, into position to be embraced by the plate cam G, in which locked position, the shell in the explosion chamber may be exploded.

The explosion chambers K are formed, at opposite sides, with male and female hinge members, indicated respectively at $K^5$, $K^6$, said members being coupled up in the form of a link chain by pins, as at $K^7$.

At the side opposite the hinge members $K^5$, $K^6$, the explosion chamber units K are provided with rollers, as indicated at $K^9$, which act to guide the explosion chamber units in their travel.

A guide chute is indicated at $K^{10}$ (see Fig. 6), which acts, in connection with the guide rollers $K^9$, to guide the linked explosion chambers in straight line travel after and before passing over the respective sprocket wheels $J'$, $J^2$.

We will now consider the mechanism whereby the loaded shells are automatically led into position to be automatically charged into the explosion chamber units of the magazine in their path of travel to the firing point of the gun.

Mounted upon, and fast to the shaft J, and rotatable therewith, is a hub member indicated at L, formed integrally with which is a head $L'$, carrying a cylindrical body $L^2$, having a rim member $L^3$. Extending lengthwise through the rim member $L^3$, and through the head $L'$, are a plurality of bores $L^4$, and extending parallel therewith and communicating with said bores $L^4$ and with the interior of the cylindrical member $L^2$, are a plurality of longitudinal slots $L^5$. Within the bores $L^4$ are movably placed charging plungers $L^6$, of approximately the same diameter or caliber as the cartridge which the gun is adapted to use. Upon a projection $L^7$ on the plunger $L^6$ is mounted a roller guide member $L^8$, by the control and movement of which member the respective charging plungers are longitudinally moved to charge the travelling magazine.

Immovably mounted upon the shaft J (carried by the split bearing I) is a cam member $L^9$, having a cam race $L^{10}$, so directed and proportioned as to receive and guide, and propel forward and back, the guide roller $L^8$, together with the plunger $L^6$, to which said roller is connected. In other words, on rotation of the cylinder $L^2$, the plungers $L^6$, under impulsion of the cam-controlled roller $L^8$, one after the other, travel to the limit permitted by the cam race, and, on further rotation of the cylinder $L^2$, the plungers, are separately retracted to the starting point.

Adapted to rotate with the shaft J is a cartridge feed cylinder M, having an annular flange $M^2$ fast to the head $L'$ of the charging cylinder $L^2$. Upon the periphery of the cartridge feed cylinder M are a plurality of circumferentially extending and parallel rows of teeth $M^3$, which teeth co-operate with a cartridge conveyor belt or bandolier, preferably of thin metal, having orifices to register with said teeth and through which said teeth project, the cartridges being carried in loops of elastic fabric between said orifices.

The operation of transferring the cartridges, and the belt containing the same, into proper position on the feed cylinder M, to be acted upon by the charging plungers of the charging cylinder $L^2$, will be made clear by an inspection of Figs. 6, 4 and 8.

Suspended from the transverse frame $C'$ is a support N, which carries a depending arm $N'$, upon which is pivoted, at $N^2$ an oscillating arm $N^3$, the oscillations of the arm $N^3$ being governed by a flat spring $N^4$, secured at $N^5$ to the arm $N'$, and arranged to contact, on its inner side, with the head of a latch $N^6$, pivoted at $N^7$ upon the oscillating arm $N^3$.

The lower portion of the oscillating arm $N^3$ and a lateral rearward extension thereof $N^8$, act as a bearing for a stud $N^9$, upon one end of which stud is supported rotatably a toothed idler wheel O, which wheel has a configuration, between the transverse rows of teeth, such that cartridges $O^2$, contained in loops $O^3$, in an orificed belt $O^4$ may lie lengthwise within the grooves $O^5$ of said idler wheel (see Figs. 4, 6 and 12), the orifices in said belt being indicated at $O^6$ and the teeth of the idler wheel at $O'$.

The cartridge conveyor belt $O^4$ may be led to the idler wheel O from a reel of suitable design, such as I illustrate herein, and which will be hereinafter described.

The cartridge-carrying bandolier is passed over the idler wheel O and onto the feed cylinder M, being drawn thereto by the rotation of the latter, and the cartridges are, one at a time, successively removed from the loops of the belt $O^4$ by the charging plungers $L^6$, each succeeding cartridge being taken in hand by the plunger registering therewith on the rotation, synchronously, of the feed cylinder M and the charging plunger cylinder $L^2$, the gradual longitudinal movement of the plungers being such that when a cartridge has been carried approximately a half revolution on the feed cylinder M, it is fully contained within an explosion chamber K, the final pressure of the plunger pushing it firmly therein, in which final movement the guide chute $K^{10}$ acts as a stop, contacting with the rollers $K^9$ on the explosion chamber K, to prevent lateral displacement of the latter.

The mechanism by which the exploded shells are automatically extracted from the explosion chambers of the magazine will now be described.

Mounted upon the shaft J, and adapted to rotate therewith, is a sprocket wheel P. Upon the arm N', of the support N, is suitably mounted a bearing P', adapted to support one end of a shaft $P^2$, the other end being mounted within a bearing $P^3$, supported by a bracket $P^4$, the latter being connected by the split bearing $P^5$ and bolts $P^6$, to the longitudinal tie rod $C^5$. Upon the shaft $P^2$ is carried a sprocket wheel $P^7$. The sprocket wheels P, $P^7$ carry a sprocket drive chain $P^8$, by which the shaft $P^2$ is rotated, when the shaft J is rotated.

Also mounted upon the arm N' is an angular bracket $P^9$, which, at the other end, is connected, as at $P^{10}$, to, and acts as a support for the lower end of, a guide chute $P^{11}$, the upper end of said chute being connected, as at $P^{12}$, to the longitudinal tie rod $C^3$. This guide chute, being similar in structure to the guide chute $K^{10}$ at the opposite side of the apparatus, has, for its function, to retract the explosion chambers (by contacting with the rollers $K^9$ thereon) from the ends of the barrels, after the charge has been fired, and thereafter guide said explosion chambers with their contained exploded cartridges in straight-line downward travel, including their approach to the point of ejection of the exploded shells. (See Fig. 4.)

Mounted upon flanges $P^{13}$, $P^{14}$ of the plate $P^4$ is a spindle $P^{15}$, carrying a worm $P^{16}$, meshing with a worm wheel $P^{17}$, carried by and rotating with the shaft $P^2$. The spindle $P^{15}$ of the worm $P^{16}$ carries, at its lower end, a gear wheel $P^{18}$, which, in turn, meshes with a pinion $P^{19}$ rotatably mounted upon a stud $P^{20}$, depending from and fast to the flange $P^{14}$, of the support plate $P^4$, said pinion $P^{19}$ being secured to, and rotatable with, a cylindrical friction member $P^{22}$ rotatably carried by said stud $P^{20}$. Also carried by the support plate $P^4$ is a cam chute $P^{23}$, conforming transversely to the shape of the rear end of the explosion chambers K, and formed with inwardly projecting cam edges $P^{24}$, $P^{25}$, adapted to fit behind the flange carried at the rear end of the cartridges and thereby grip the latter. The direction of the opposing cam edges $P^{24}$, $P^{25}$, being on a curve progressively rearward, on the downward travel of the explosion chambers, the exploded shells are successively partially removed therefrom. Disposed opposite the friction roller member $P^{22}$, is a rotary idler member $P^{26}$, carried by a bracket $P^{27}$, pivoted at $P^{28}$, to the plate $P^4$, and held normally in upright position by the spring $P^{29}$, one end of the spring being held by a stud $P^{30}$ on the movable member $P^{27}$, the spring then passing over and around the pivot pin $P^{28}$, and held at the other end by a stud $P^{31}$ projecting from the stationary plate $P^4$. As the cartridges are partially ejected from the explosion chambers by the cam before described, they are taken in hand by the opposing rollers, the roller $P^{26}$ being laterally movable to receive and hold the shell in a flexible grip, while the fast-revolving member $P^{22}$ brushes the shell into a chute $P^{32}$ suitably suspended from the longitudinal tie rod $C^5$, from whence it is deposited upon the ground or any desired receptacle therefor.

We will now consider the automatic means whereby the barrel cylinder $D^9$, and the mechanism connected thereto, are rotated, under the action of the gas generated in the firing of the explosive charges, as well as the means I have provided to prevent accidents, or injury, to the operator, due to retardation in firing the cartridges.

Secured immovably, upon the tie rods $C^3$, $C^4$, is a support Q, having an angular extension Q', a curved extension piece $Q^2$, and an intermediate extension piece $Q^3$.

Figure 13:
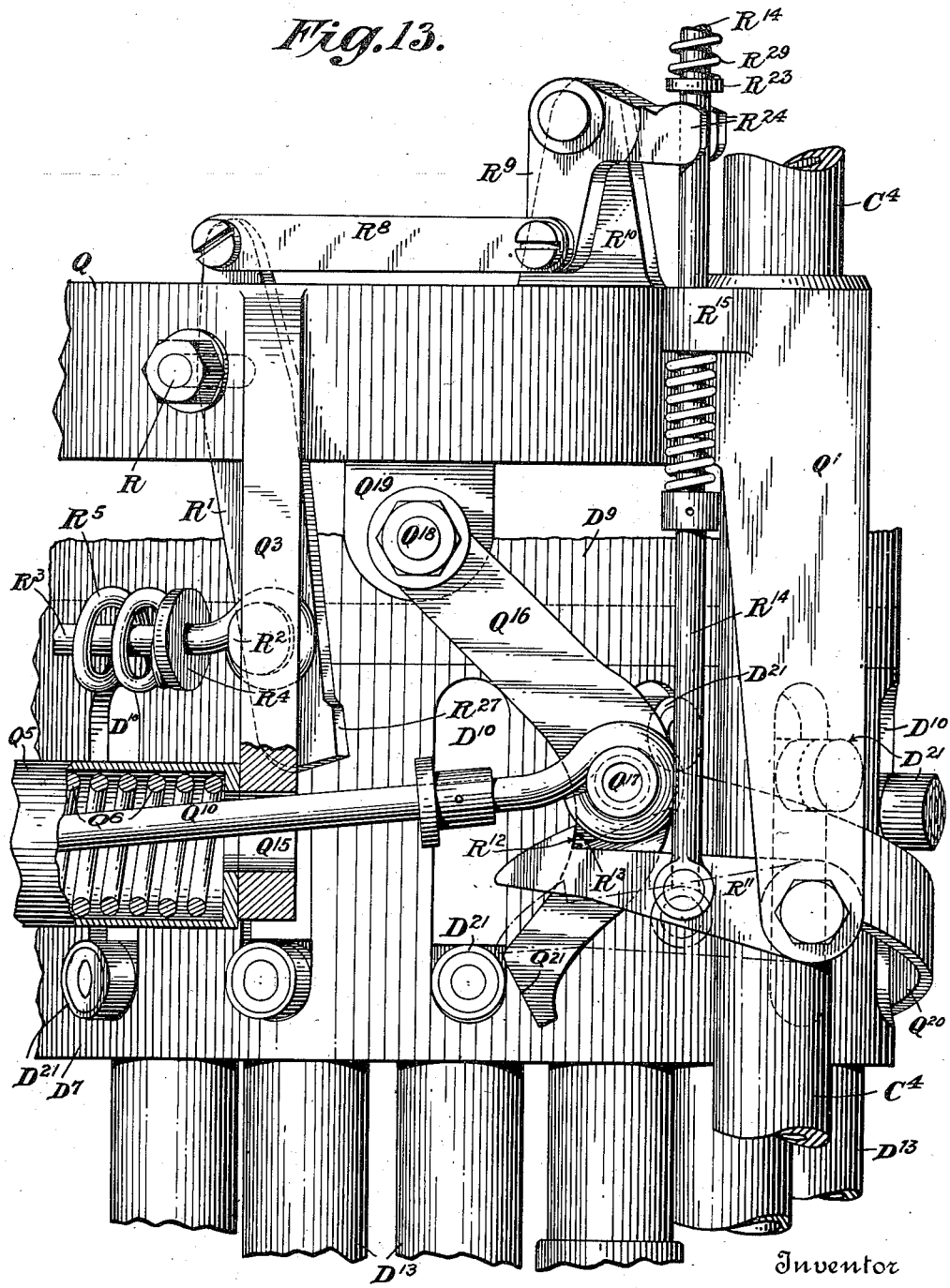
Fig. 13 is an enlarged fragmentary plan view of some of the operating parts, as viewed from a point indicated by the arrow 13 in Fig. 12, the mechanism being here shown in locked position, preventing automatic firing but permitting manual, single-shot firing.

Suitably mounted, upon the intermediate extension piece $Q^3$, and tangentially to the periphery of the barrel cylinder $D^9$, is a spring impulse motor $Q^4$ (see Figs. 3, 12 and 13). According to the form illustrated in the drawings, it comprises a cylindrical casing $Q^5$, a spring contained therein, $Q^6$, having a movable head $Q^7$, against which one end of said spring rests, the other end of said spring resting against the opposite end of the cylindrical casing, as clearly shown in Fig. 12. The head $Q^7$ has an opening $Q^8$ through which protrudes the threaded end $Q^9$ of an operating rod $Q^{10}$, the longitudinal movement of which is normally controlled by said spring. The tension of said spring may be increased or decreased by a hand wheel $Q^{11}$, the stem of which $Q^{12}$ is screwed on the threaded end $Q^9$ of the rod $Q^{10}$, and serves as an adjustable abutment for the head $Q^7$, which is pressed against it by the spring $Q^6$. The stem $Q^{12}$ of the hand wheel $Q^{11}$ is adapted to reciprocate and rock in a tapered bore $Q^{13}$ located in the cap $Q^{14}$, which is screwed to the casing $Q^5$. The opposite end of the operating rod $Q^{10}$ projects through an opening $Q^{15}$ in the extension piece $Q^3$, and is pivotally secured to one end of a cam lever $Q^{16}$, as at $Q^{17}$, said cam lever $Q^{16}$ being pivotally secured, as at $Q^{18}$ to a tongue $Q^{19}$, rigidly mounted upon the support member Q.

Mounted upon the longitudinal tie rods $C^4$, $C^5$, $C^6$, is a curved cam plate $Q^{20}$ (see Figs. 1 and 13), the function of which is to properly position the guide rollers $D^{21}$ of the guide cylinders $D^{13}$ within the respective longitudinal guide openings $D^{10}$ upon the rotary movement of the barrel cylinder $D^9$ (see Figs. 1 and 13).

The operation of the parts just described will be clear from an inspection of Fig. 3. When a charge is exploded, the roller $D^{21}$, directly behind the cam lever $Q^{16}$, being connected to the movable guide cylinder $D^{13}$, is drawn forward, under action of the gases expanding in the expansion chamber $D^{26}$, and as said roller is driven forward, it slidingly contacts with the curved cam surface of the cam lever $Q^6$, thereby placing under compression the spring $Q^6$, and, as the roller $D^{21}$ slips over the end of the cam lever $Q^{16}$ and into, and is held by, the end of the slot $D^{10}$, the end $Q^{21}$ of said lever, acting against said roller, and the latter against the wall of the slot $D^{10}$, rotates the barrel cylinder $D^9$, to bring into position the roller $D^{21}$ next following, and so on, as long as it is desired to continue the firing operation. It will be noted that, by the hand wheel $Q^{11}$, the tension of the spring $Q^6$ may be so weakened as to eliminate the automatic feature of the gun, in which case it may be hand operated; or, by increasing the tension, the automatic operation of the gun may be made more rapid.

The safety mechanism to provide against accidents due to possible retarded explosions of shell charges may be described as follows (see Fig. 3): Pivotally mounted, as at the fulcrum R, upon the cross support Q, is a lever R', the long arm of which has pivoted thereto, as at $R^2$, a rod $R^3$, having a head $R^4$, contacting with a compression spring $R^5$, the other end of said rod $R^3$ being adapted to slide within an opening $R^6$ in one end of the extension $Q^2$, being held by a nut $R^7$, the other end of said spring contacting with the face of said extension $Q^2$, as clearly shown in Figs. 3 and 12. The short arm of the lever R' is pivotally connected by a link $R^8$, to a bell crank lever $R^9$ pivotally mounted upon a tongue $R^{10}$ projecting from the cross support Q.

Pivotally connected to the extension piece Q' of the cross support Q is a latch $R^{11}$, having an angular notch $R^{12}$ which notch may, in certain positions of the mechanism, engage a notched lug $R^{13}$ on the lever $Q^{16}$.

Pivotally connected to the latch $R^{11}$ is a tripping rod $R^{14}$, which extends through a bearing $R^{15}$ on the extension Q', and having its other end slidably mounted in a bearing $R^{16}$ on the rear cross frame $C^2$. A hand operated lever $R^{17}$ is also suitably mounted on the cross frame $C^2$, and connected thereto, eccentrically of its fulcrum, are a pair of links $R^{18}$, pivoted as at $R^{19}$, which links, at their forward ends, are pivoted to a head $R^{20}$ movably mounted upon the tripping rod $R^{14}$. A collar $R^{21}$ is rigidly secured to the rod $R^{14}$ and against it presses one end of a spring $R^{22}$, the other end of said spring resting against the movable head $R^{20}$.

It will be noted that the spring $R^{22}$, when the lever $R^{17}$ is in upturned position, will normally tend to throw the rod $R^{14}$ to the front, but when said lever is turned down in reverse position, the links $R^{18}$ will be thrown rearwardly, drawing therewith the head $R^{20}$ and throwing the tripping rod $R^{14}$ to the rear.

Upon the rod $R^{14}$, at a point adjacent the bell crank lever $R^9$ is rigidly mounted a collar $R^{28}$, contacting with which is one end of a spring $R^{29}$, the other end of said spring being connected to a movable collar $R^{23}$, also mounted upon said rod $R^{14}$, which collar rests against the bifurcated end $R^{24}$ of the bell crank lever $R^9$.

Also mounted upon the rod $R^{14}$ is a spring $R^{25}$, one end of which rests against the forward face of the bearing $R^{15}$ of the extension piece Q', and the other end against the collar $R^{26}$, fast to the rod $R^{14}$.

Assuming that there is delayed firing of an explosive charge in an explosion chamber, and that the momentum of the barrel cylinder, due to previous firing, is sufficient to rotate said cylinder and the delayed charge beyond the normal firing point, the roller $D^{21}$ (see Fig. 3) will contact with the face $R^{27}$ of the lever R', and the momentum may be taken up in compressing the spring $R^5$, bringing the barrel cylinder to a stop, whereupon the operator may resume firing by manually slipping the roller $D^{21}$ past the face $R^{27}$ of the lever R', and turn the hand crank $J^4$, to bring into position and fire another charge, after which the mechanism will again work automatically. If, however, the momentum of the barrel cylinder is not fully expended in compressing the spring $R^5$ and the barrel cylinder rotates sufficiently to bring another shell to the firing point, the further travel of the roller $D^{21}$ will act on the lever R', link $R^8$, bell crank lever $R^9$ and spring $R^{29}$ to throw the tripping rod $R^{14}$ to the rear, so that as the succeeding shell is fired and the guide roller $D^{21}$ acts against the cam surface of the lever $Q^{16}$, the notch on the lever $R^{11}$ will be tripped into the notched lug $R^{13}$ of the lever $Q^{16}$ and hold said lever and spring $Q^6$ in inoperative position and prevent further rotation of the barrel cylinder until manually released. The operation of the gun may thereupon be resumed as before described.

Thus, it is not possible for a loaded shell, the firing of which is retarded, to progress to a point where the explosion chamber containing said shell is out of alignment with its particular rifled barrel. In other words, it insures the shell exploding, if at all, within the safe zone wherein it is intended the explosion of the charge shall take place, and not after the explosion chamber and its barrel have become separated, in their respective paths of travel.

Also, by means of the lever $R^{17}$, the automatic firing of the gun may be quickly stopped, for after turning that lever only one shot will be automatically fired.

It has been shown that by varying the tension of the motor spring $Q^6$, the rate of automatic firing may be increased or decreased or the firing may be stopped completely.

As a further means of controlling the automatic firing of the gun, I provide, within ready grasp of the operator, a braking mechanism comprising a brake band S adjacent the periphery of the firing cylinder $E^2$ (see Fig. 4) one end of which band is mounted upon the longitudinal tie rod $C^5$ and the other end to a brake arm S', which is fulcrumed upon the longitudinal tie rod $C^3$, being secured in position by collars $C^{13}$, $C^{13}$, fast to said tie rod. A brake shoe $C^{11}$ is carried by the brake band S. The upper end $C^{12}$ of the brake band being mounted upon the arm S' eccentrically of the fulcrum of the latter, inward movement of said arm will cause the brake shoe $C^{11}$ to frictionally engage the periphery of the firing cylinder $E^2$, and movement in the opposite direction will release the same. By this means the automatic firing of the gun may be slowed down or brought to a full stop.

The gun is suitably mounted, at approximately its longitudinal center of gravity, upon a stand T, comprising a standard T' having supporting legs $T^2$. Upon the upper portion of the standard T', mounted preferably upon antifriction bearings $T^3$, is a swivel member $T^4$, formed at its lower portion with a split bearing $T^5$, the contiguous faces, at the point of division, having projecting bosses $T^6$, within a threaded bore in which lies a screw $T^7$, which may be turned, by means of the lever $T^8$, to tighten or loosen the split bearing $T^5$ in its grip upon the standard T'.

At the upper portion of the swivel member $T^4$ is a sleeve $T^9$ within which is pivotally received the trunnion $C^{10}$ extending from the intermediate cross frame C', which sleeve is formed as a split bearing having bosses $T^{10}$, through a threaded bore in which projects a screw $T^{11}$, which may be tightened or loosened by the lever $T^{12}$, the short arm of which is connected to an extension $T^{13}$ on the head of the screw $T^{11}$.

By upward pressure against the lever $T^{12}$, the screw $T^{10}$ is loosened, and thereupon the ends of the gun may be raised or lowered, and a downward pressure on said lever will tighten the screw and split bearing and hold the gun in the desired position. By similar movement of the lever $T^8$, the gun may be rotated upon the standard T' as a pivot and the ends of the gun turned to the right or left.

Figure 14:
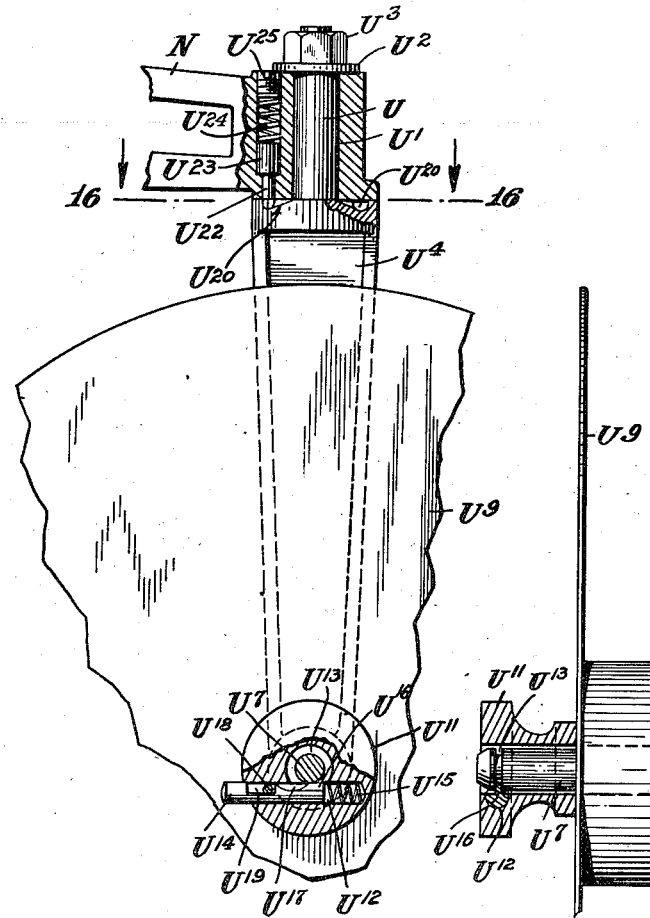
Fig. 14 is a side elevation, partly in section, of the reel bracket and reel thereon, in part broken away.
Figure 15:
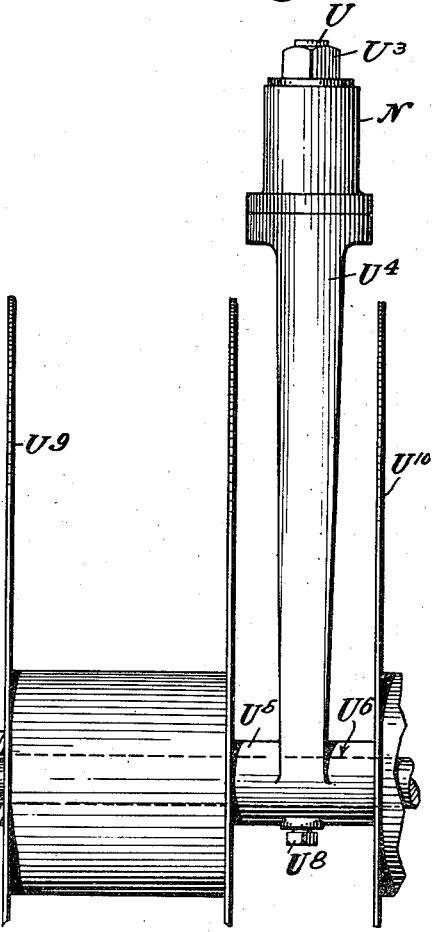
Fig. 15 is an end elevation, partly in section, of the parts shown in Fig. 14, and Fig. 16, is a detail plan section through the reel bracket on line 16—16, of Fig. 14, in the direction of the arrows.
Figure 16:
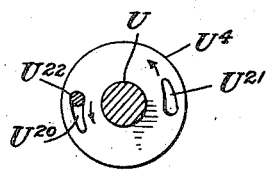

In Figs. 14, 15 and 16 I show a form of reel which I prefer for use in connection with the gun.

Carried upon a diagonally projecting arm of the support N, by means of a stud U projecting through a bore U' in the end of the arm, and held in position by a washer $U^2$ and nut $U^3$, is a depending reel arm $U^4$, provided at its lower portion with a horizontal bearing member $U^5$, having a bore $U^6$, within which is disposed a spindle $U^7$, which is made fast to the bearing member $U^5$ by the set screw $U^8$. Mounted upon the spindle $U^7$, at each side of the arm $U^4$, are reels $U^9$, $U^{10}$, said reels being held in position by a thumb nut $U^{11}$. The nut $U^{11}$ has a transverse bore $U^{12}$. The end of the spindle $U^7$ is formed with a keyway $U^{13}$. Within the bore $U^{12}$ is a pin $U^{14}$, one end of which normally projects exteriorly of the thumb nut $U^{11}$, being so held by a spring $U^{15}$ lying between the end of the bore $U^{12}$ and the inner end of the pin $U^{14}$. The pin $U^{14}$ is formed with a cutaway portion, providing a key $U^{16}$, which, under action of the spring $U^{15}$, normally lies within the key-way $U^{13}$. Said pin is also formed with a curved surface $U^{17}$, which, upon pressure upon the outer end of the pin $U^{14}$, affords clearance for the spindle $U^7$, the key $U^{16}$ being moved out of registry with the key-way $U^{13}$. The pin is held within the slot by a pin $U^{18}$ transversely held within the slot $U^{19}$. Thus, by pushing on the pin $U^{14}$, the thumb nut $U^{11}$ may be removed, and thereupon, the reel itself.

The upper surface of the standard $U^4$ (see Fig. 16) is formed, at opposite sides, with cam surface grooves $U^{20}$, $U^{21}$, the deepest points of said grooves being indicated at the enlarged ends thereof, the cam surface $U^{20}$ ascending in one direction, and the cam surface $U^{21}$ ascending in the opposite direction. These cam grooves are adapted to receive holding pins $U^{22}$, each having a head $U^{23}$, against which acts a spring $U^{24}$, the latter being held in position by a small screw $U^{25}$. It will be understood, from Fig. 16, that two such spring-pressed pins are used, although but one is shown in Fig. 14.

Assuming that two reels have been filled with ammunition belts, (See Fig. 3), as soon as the supply in one reel is exhausted, hand pressure is applied to turn the reels annularly about the stud U as an axis. In such movement, the oppositely disposed pins $U^{22}$ ride up the cam surfaces $U^{20}$, $U^{21}$, in the direction shown by the arrows in Fig. 16, until, when said pins reach the respective cam depressions $U^{22}$, with head $U^{23}$, the reels will be held in that position until pressure is again applied to rotate the reels annularly as stated above. In this manner a full reel is always held in reserve, and one half turn is all that is necessary to bring it into true alignment transversely with the idler wheel O, leading to the feed cylinder M.

Front and rear sights for the gun are provided, as indicated at V, V'.

I will now give a brief statement of the general operation of the gun:

From the reel $U^9$, the belt $O^4$, with the cartridges contained in loops $O^3$ thereon, is led to and placed upon the idler wheel O, and the latter turned to permit engaging the end of the belt with the teeth on the feed cylinder M, which operation will be facilitated by first releasing the latch $N^6$ and oscillating the arm $N^3$ on its pivot and momentarily withdrawing the wheel O from the feed cylinder M; when the latter has hold of the belt, the wheel O is thrown back into place, the latch $N^6$ locking it in position.

Assuming the lever $R^{17}$ to be in upturned position and the safety mechanism in position to permit automatic firing, the crank $J^4$ is turned, rotating the shaft J, and, therewith, the feed cylinder M, charging cylinder $L^2$, the travelling magazine formed of the units K, and the firing cylinder $E^2$.

Approximately a half revolution of the crank $J^4$ serves to charge the first of the explosion chambers K, the others, on further turning of the crank, being successively loaded. Turning of the crank $J^4$ brings the cartridge to the firing point, which is clearly indicated in Fig. 3, where, it will be seen that the guide roller $D^{21}$ (of the cylinder $D^{13}$ on the barrel $D^5$) is directly behind the curved cam surface of the cam lever $Q^{16}$, and in longitudinal alignment with the explosion chamber K and with the clamping bolt $E^4$ (containing the firing pin $E^5$), said clamping bolt being engaged by the cam plate G to close the rear end of the explosion chamber (with its contained cartridge) and press the explosion chamber against the end of the rifled barrel $D^5$.

The discharge of the first cartridge, due to the gas therefrom acting on the cylinder $D^{13}$, guide roller $D^{21}$, cam lever $Q^{16}$ and spring $Q^6$, actuates the barrel cylinder, which makes a partial revolution, bringing the next following aligned barrel, explosion chamber and other mechanism just described in operative position for the firing of another cartridge. Thus, the successive discharges serve to charge, successively, the explosion chambers of the travelling magazine, bring them into position for engagement with the clamping bolts and rifled barrels, lock the same, fire the charge, eject the empty shells, and propel the cartridge belt from the reel.

After the explosion chambers K, of the travelling magazine, have passed the safe firing zone—which, it will be understood, is when said explosion chambers are in contact with the cam plate G—said chambers are retracted from the rear ends of the barrels by guide cam chute $P^{11}$, acting on the guide rollers $K^9$ (see Fig. 4), and positioned for the shells to be acted upon by the cam edges $P^{24}$, $P^{25}$ and rotary members $P^{22}$, $P^{26}$ of the ejecting mechanism, to eject the exploded shells. Just previous to the retraction of the explosion chambers K, the clamping bolts $E^4$ are retracted, under action of the cam $F^2$, as more clearly shown diagrammatically in Fig. 11.

At whatever speed the gun is operated, the rifled barrels, the travelling magazine, the clamping and firing cylinder and the charging cylinder and feed cylinder follow synchronously a predetermined path, and there will always be truly aligned with the rifled barrels, when they arrive at the firing point and pass the cam plate G, the respective explosion chamber units and the clamping and firing mechanism before described.

As already explained, if the firing of a cartridge should be retarded, the safety mechanism operating, or operated by, the tripping rod $R^{14}$, insures that the charge shall explode, if at all, while the respective rifled barrels, magazine and clamping bolts are properly aligned and held in engagement by the cam plate G. It may be here remarked that at the normal firing point the clamping members, explosion chamber units and barrels are acted upon with great force by the cam plate G, to hold them in rigid locked position, but, as they emerge from the normal firing position, the cam eases up its pressure, so as to avoid unnecessary friction between the cam and the clamping members.

It will be understood, that as the gun is fired, the cylinders $D^{13}$ are moved forwardly (see Fig. 3). These cylinders are thereafter retracted into operative position by the guide rollers $D^{21}$ (connected to said cylinders) contacting with the cam $Q^{20}$, said guide rollers being thereby moved from the forward to the rear ends of the openings $D^{10}$, so as to resume their positions behind the cam lever $Q^{16}$, as the barrel cylinder is rotated.

The rapidity of automatic fire may be controlled, or automatic fire altogether stopped, by manipulation of the hand wheel $Q^{11}$, governing the action of the spring $Q^6$, or automatic fire may be stopped by reversing the lever $R^{17}$, in which event the gun may be operated by hand by turning the crank $J^4$. Again, the rapidity of fire may be controlled, or firing stopped, by means of the brake S.

By manipulation of the levers $T^8$, $T^{12}$, the gun may be respectively rotated, or elevated and depressed, for training upon a target.

It will be noted that the expansive power of the gases resulting from the combustion of the explosive is not exerted upon the movable motor-cylinder $D^{13}$ until the projectile discharged through the barrel $D^5$ has actually left the end of the barrel. Thus, the operating movement of the motor-cylinder $D^{13}$ in no wise detracts from the force of the explosive acting upon the projectile, such movement being, in fact, entirely due to the expansive force of the waste products of combustion after the full force of the explosive has been expended upon the projectile.

I desire it to be understood that I do not confine myself to the precise details of construction and arrangement of the invention as herein set forth, as modification and variation may be made without departing from the spirit of the invention, as defined by the appended claims.

What I claim is:

1. In a gun of the class described, the combination of rotatable means for supporting a series of gun barrels, means for supporting, contiguous to said barrels, a travelling magazine comprising a series of explosion chambers, means for loading the explosion chambers of said magazine while in travel to said barrels, means for holding said explosion chambers to said barrels and firing the charge, and means operatively connecting said barrel-supporting means with said other stated mechanisms, whereby, on the rotation of said barrel-supporting means, the other stated mechanisms are actuated.

2. In a gun of the class described, the combination of rotatable means for supporting a series of gun barrels, means for supporting, contiguous to said barrels, a travelling magazine comprising a series of explosion chambers, means for loading the explosion chambers of said magazine while in travel to align with said barrels, means for successively binding said explosion chambers to said barrels and firing the charge, means operatively connecting said barrel-supporting means with said other stated mechanisms, whereby, on the rotation of said barrel-supporting means, the other stated mechanisms are actuated, and means for causing automatic rotation of said barrel-supporting means.

3. In a gun of the class described, the combination of rotatable means for supporting the series of gun barrels, means for supporting, contiguous to said barrels, a travelling magazine comprising a series of explosion chambers, means for loading the explosion chambers of said magazine while in travel to align with said barrels, means for holding said explosion chambers to said barrels and firing the charge, means operatively connecting said barrel-supporting means with said other stated mechanisms, whereby, on the rotation of said barrel-supporting means, the other stated mechanisms are actuated, and gas-operated means for rotating said barrel-supporting means.

4. In a gun of the class described, the combination of a rotatable member carrying a plurality of gun barrels, an endless travelling magazine, comprising a plurality of connected explosion chambers, contiguous to said rotatable member, and adapted to be operatively aligned with said barrels, clamping and firing mechanism and means associated therewith adapted to clamp said explosion chambers respectively to the respective barrels and fire the charge, cartridge-feeding and charging mechanism contiguous to said magazine and operatively connected to said rotatable member for loading successively the explosion chambers of said magazine, and means for automatically rotating the rotatable member and thereby actuating the other connected mechanisms stated.

5. In a gun of the class described, the combination of a rotatable member carrying a plurality of gun barrels, an endless travelling magazine, comprising a plurality of connected explosion chambers, contiguous to said rotatable member, and adapted to be operatively aligned with said barrels, clamping and firing mechanism and means associated therewith adapted to clamp said explosion chambers respectively to the respective barrels and fire the charge, cartridge-feeding and charging mechanism contiguous to said magazine and operatively connected to said rotatable member for loading successively the explosion chambers of said magazine, and gas operated means for causing automatic operation of said rotatable member and thereby actuating said other mechanisms stated.

6. In a machine gun, the combination of longitudinal and transverse framing members, a bearing rod carried by said transverse members, a rotatable sleeve member carried by said bearing rod, gun barrels carried by said sleeve member, a rotatable power shaft, an endless travelling magazine, comprising a series of connected explosion chambers, carried by said sleeve member and power shaft, means actuated by said rotatable shaft for consecutively feeding and charging loaded shells into said explosion chambers, means for clamping the explosion chambers of the magazine to said barrels and successively firing the charges, means for successively ejecting the shells from said explosion chambers, means for manually operating said rotatable shaft and thereby operating said sleeve and inter-connected mechanisms, and means for automatically rotating said sleeve and thereby operating said rotatable shaft and inter-connected mechanisms.

7. In a gun of the class described, the combination of a rotatable body carrying a plurality of gun barrels, a motor-spring rigidly supported adjacent said rotatable body, sliding cylinders on said barrels, and means cooperating with said motor spring and said sliding cylinders, to rotate said body by the expansive power of the gases from combustion of the explosive.

8. In a gun of the class described, the combination of a rotatable body supporting a plurality of gun barrels, said rotatable body having longitudinal guide openings, a motor-spring supported adjacent said rotatable body, sliding motor cylinders on said barrels movable by the expansive power of the gases of combustion of the explosive, a cam lever operatively connected to said motor-spring, and a contact member on said motor cylinders, movable in said guide openings, acting on said cam lever to energize said motor-spring to rotate said rotatable body.

9. In a gun of the class described, the combination of a rotatable body carrying a plurality of gun barrels, a travelling magazine, comprising a plurality of explosion chambers adapted to align with said barrels, and clamping and firing mechanism, comprising a cylindrical body, rotatable with said barrel body, a plurality of clamping members movably carried by said cylindrical body adapted to align with said explosion chambers and barrels, a plurality of firing pins movably carried by said clamping members, and cam means adapted to position said clamping members and retract and release said firing pins to fire the charge.

10. In a gun of the class described, the combination of a rotatable body carrying a plurality of gun barrels, a travelling magazine, comprising a plurality of explosion chambers adapted to align with said barrels, clamping and firing mechanism, comprising a cylindrical body, rotatable with said barrel body, a plurality of clamping members carried by said cylindrical body adapted to align with said explosion chambers and barrels, a plurality of firing pins movably carried by said clamping members, cam means adapted to position said clamping members and retract and release said firing pins to fire the charge, and a cam for clamping the explosion chambers to said barrels before firing the charge.

11. In a gun of the class described, the combination of a rotatable body carrying a plurality of gun barrels, a travelling magazine comprising a plurality of explosion chambers adapted to align with said barrels, means for holding said explosion chambers rigidly to said barrels and firing the charge, and feeding and charging means adapted to feed shells to, and load, said explosion chambers while in motion, said feeding and charging means comprising a rotatable cylindrical body carrying the loaded cartridge shells, and a rotatable cylindrical body provided with a plurality of charging plungers adapted to move said cartridge shells from the feed body to and into said explosion chambers.

12. In a gun of the class described, the combination of a rotatable body carrying a plurality of gun barrels, a travelling magazine comprising a plurality of explosion chambers adapted to align with said barrels, means for holding said explosion chambers rigidly to said barrels and firing the charge, and feeding and charging means adapted to feed and load said explosion chambers while in motion, said feeding and charging means comprising a rotatable cylindrical body carrying the loaded cartridge shells and a rotatable cylindrical body provided with a plurality of charging plungers adapted to move said cartridge shells from the feed body to and into said explosion chambers, and means for actuating all of said stated mechanisms automatically by the expansive power of the gases of combustion of the explosive.

13. In a gun of the class described, the combination of a rotatable body carrying a plurality of gun barrels, a travelling magazine comprising a plurality of explosion chambers adapted to align with said barrels, means for holding said explosion chambers rigidly to said barrels and firing the charge, and feeding and charging means adapted to feed and load said explosion chambers while in motion, said feeding and charging means comprising a rotatable cylindrical body carrying the loaded cartridge shells and a rotatable cylindrical body provided with a plurality of charging plungers adapted to move said cartridge shells from the feed body to and into said explosion chambers, and means for both manually and automatically actuating all of said stated means and mechanisms.

14. In a gun of the class described, the combination of a plurality of barrels, collectively rotatable, a plurality of explosion chambers travelling in a pre-determined path to align with said barrels, a plurality of clamping members and firing pins aligning with said explosion chambers and barrels and collectively rotatable with the latter, means for successively loading said explosion chambers while in motion, means for causing said clamping members to successively engage said explosion chambers with said barrels, means for successively actuating the firing pins to explode the loaded shells, mechanism for discharging the empty shells from said explosion chambers while in motion, and driving means for actuating said recited means and mechanism.

15. In a gun of the class described, the combination of a plurality of barrels, collectively rotatable, a plurality of explosion chambers travelling in a pre-determined path to align with said barrels, a plurality of clamping members and firing pins aligning with said explosion chambers and barrels and collectively rotatable with the latter, means for successively loading said explosion chambers while in motion, means for causing said clamping members to successively engage said explosion chambers with said barrels, means for successively actuating the firing pins to explode the loaded shells, mechanism for discharging the empty shells from said explosion chambers while in motion, and automatic driving means for actuating said recited means and mechanism.

16. In a gun of the class described, the combination of a rotatable body carrying a plurality of gun barrels, a travelling magazine comprising a series of explosion chambers adapted to align with said barrels, means for depositing explosive shells in said explosion chambers while the latter are in motion, means for firing said shells while said chambers are aligned with said barrels, and means for rotating said body and actuating said magazine and said depositing and firing means by the expansive power of the gases of combustion of the explosive.

17. In a gun of the class described, the combination of a rotatable body carrying a plurality of gun barrels, a travelling magazine comprising a series of explosion chambers adapted to align with said barrels, means for depositing explosive shells in said explosion chambers while the latter are in motion, means for firing said shells while said chambers are aligned with said barrels, and means for rotating said body and actuating said magazine and said depositing and firing means by the expansion of the gases resulting from combustion of the explosive, after the projectiles leave said barrels.

18. In a gun of the class described, the combination of a rotatable body carrying a plurality of gun barrels, a travelling magazine comprising a series of explosion chambers adapted to align with said barrels, means for depositing explosive shells in said explosion chambers while the latter are in motion, means for firing said shells while said chambers are aligned with said barrels, means for ejecting the empty shells from said explosion chambers while in motion, and means for rotating said body and actuating said magazine, said depositing and firing means, and said ejecting means, by the waste gas of combustion of the explosive.

19. In a gun of the class described, the combination of a rotatable body carrying a plurality of gun barrels, a travelling magazine comprising explosion chambers aligning with said barrels, clamping and firing mechanism rotating with said barrel carrying body, mechanism for loading said magazine, mechanism for ejecting the empty shells, said magazine and mechanisms having operative connection with and being adapted to be driven by said barrel carrying body, means for automatically rotating said barrel carrying body by the expansive power of the gases resulting from the combustion of the explosive, and automatic means for stopping the automatic operation of said barrel body in case of retarded firing of the explosive.

20. In a gun of the class described, the combination of a rotatable body carrying a plurality of gun barrels, a travelling magazine comprising explosion chambers aligning with said barrels, clamping and firing mechanism rotating with said barrel carrying body, mechanism for loading said magazine, mechanism for ejecting the empty shells, said magazine and mechanisms having operative connection with and being adapted to be driven by said barrel carrying body, means for automatically rotating said barrel carrying body by the expansive power of the gases resulting from the combustion of the explosive, and manually operated means for preventing or stopping the automatic rotation of said barrel carrying body.

21. In a gun of the class described, the combination of a rotatable body carrying a plurality of gun barrels, a travelling magazine comprising explosion chambers aligning with said barrels, clamping and firing mechanism rotating with said barrel carrying body, mechanism for loading said magazine, mechanism for ejecting the empty shells, said magazine and mechanisms having operative connection with and being adapted to be driven by said barrel carrying body, means for automatically rotating said barrel carrying body by the expansive power of the gases resulting from the combustion of the explosive, and a manually operated brake mechanism for varying the speed of or stopping the automatic operation of said barrel carrying body and magazine and stated mechanisms.

22. In an automatic gun, the combination with a travelling magazine of means for ejecting shells therefrom while in motion, said means comprising a cam for partially ejecting said shells, a plurality of rotatable members between which the shells are delivered in sequence, and means for positively rotating one of said members at a greater speed than the other.

23. In an automatic gun, the combination with a travelling magazine of means for ejecting shells therefrom while in motion, said means comprising a cam for partially ejecting said shells, and a plurality of rotatable members adapted to receive said shells there-between, one of said members being oscillatingly supported and the other member stationary and rotating at greater speed than the first named.

24. In an automatic machine gun, the combination with a travelling magazine, of means for ejecting shells therefrom while in motion, said means comprising a cam adapted to embrace a portion of the shell and partially eject the same, and a plurality of cylindrical rotatable members to and between which said shell is delivered from said cam, one of said members being an idler secured to a pivoted support, and the other a positively driven member upon a stationary support.

25. In a device of the class described, a shell ejector for travelling magazines, comprising a cam means for partially ejecting the shells and rotatable means for completing the operation, consisting of an idler upon a pivoted support and a rapidly revolving brush member.

26. In an apparatus of the class described, the combination with a rotatable member carrying a plurality of gun barrels, of a travelling magazine, comprising a plurality of explosion chamber units connected together, means for rotating said rotatable member by power transmitted through said travelling magazine, and means for driving said travelling magazine by power transmitted through said rotatable member.

27. In an apparatus of the class described, the combination with a rotatable member carrying a plurality of gun barrels of a travelling magazine, comprising a plurality of explosion chamber units flexibly connected together to act as a chain drive, rotatable members supporting said travelling magazine, means for driving said travelling magazine and thereby actuating said first named rotatable member, and means for rotating said first named rotatable member and thereby actuating said travelling magazine.

28. In an apparatus of the class described, the combination with a series of gun barrels having a pre-determined annular path of travel, of a series of clamping members having a pre-determined annular path of travel, and a series of explosion chambers also having a pre-determined path of travel and adapted to align longitudinally with said barrels and clamping members, said stated elements having end depressions and projecting faces respectively, whereby said explosion chambers are rigidly interlocked with said barrels and clamping members respectively, on operative movement of the latter.

29. In an apparatus of the class described, the combination with an explosion chamber of a travelling magazine, of clamping and firing mechanism, comprising a longitudinally movable clamping member having a longitudinal bore, a spring-actuated firing pin in said bore, means for longitudinally moving said clamping member into and out of operative engagement with said explosion chamber, and means for retracting and releasing said firing pin.

30. In an apparatus of the class described, the combination of a travelling magazine comprising a series of connected explosion chambers, a carrier member for feeding cartridges in alignment with said explosion chambers, and a rotatable member carrying a series of longitudinally movable charging plungers for transferring said cartridges from said feeding carrier into said explosion chambers.

31. In an apparatus of the class described, the combination of a travelling magazine comprising a series of connected explosion chambers, means for feeding cartridges in alignment with said explosion chambers, a rotatable member, a series of charging plungers carried by said rotatable member for transferring said cartridges from said feeding means into said explosion chambers, and means whereby said charging plungers are gradually and progressively longitudinally moved into and out of operative position.

32. In an apparatus of the class described, the combination of a travelling magazine comprising a series of connected explosion chambers, a rotatable cartridge carrier for feeding cartridges to, and while aligned with, said explosion chambers, a rotatable plunger-carrier moving synchronously with said cartridge carrier, charging plungers carried by said plunger-carrier, contact members on said plungers, and a stationary cam member co-operating with said contact members to progressively move said plungers into and out of operative engagement with said cartridges.

FRIEDRICH BANGERTER.